United States Patent [19]
Kober

[11] 4,181,936
[45] Jan. 1, 1980

[54] DATA EXCHANGE PROCESSOR FOR DISTRIBUTED COMPUTING SYSTEM

[75] Inventor: Rudolf Kober, Munich, Fed. Rep. of Germany

[73] Assignee: Siemens Aktiengesellschaft, Berlin & Munich, Fed. Rep. of Germany

[21] Appl. No.: 832,541

[22] Filed: Sep. 12, 1977

[30] Foreign Application Priority Data

Sep. 16, 1976 [DE] Fed. Rep. of Germany ....... 2641741

[51] Int. Cl.² .................. G06F 15/16; G06F 9/00
[52] U.S. Cl. ............................................. 364/200
[58] Field of Search ... 364/200 MS File, 900 MS File

[56] References Cited

U.S. PATENT DOCUMENTS

| 3,634,830 | 1/1972 | Baskin | 364/200 |
| 3,702,462 | 11/1972 | England | 364/200 |
| 3,801,962 | 4/1974 | Moore et al. | 364/200 |
| 3,810,101 | 5/1974 | Avery | 364/200 |
| 3,976,979 | 8/1976 | Parkinson et al. | 364/200 |
| 3,997,896 | 12/1976 | Cassarino et al. | 364/200 |
| 4,024,508 | 5/1977 | Bachman et al. | 364/200 |

*Primary Examiner*—Mark E. Nusbaum
*Attorney, Agent, or Firm*—Hill, Van Santen, Steadman, Chiara & Simpson

[57] ABSTRACT

A distributed computing system has a data exchange processor which is especially adapted to control operations involving the transfer of data among components of the distributed computing system, whereby the master computer is spared the task of controlling data transfer operations.

4 Claims, 3 Drawing Figures

DATA EXCHANGE PROCESSOR FOR DISTRIBUTED COMPUTING SYSTEM

BACKGROUND

1. Field of the Invention

The present invention relates to distributed computing systems, and especially such systems in which it is necessary or desirable to transfer data among the various components of the distributed system.

2. The Prior Art

Distributed computing systems having several computers connected to cooperate with each other have been heretofore developed. One such system is described in the copending U.S. patent application, Ser. No. 732,988, filed Oct. 15, 1976. The entire disclosure of this application is hereby incorporated by reference into this specification.

As described in the aforementioned application, the system consists of several individual computers cooperating with each other and connected with other, comprising a master computer and several auxiliary or individual computers. Individual storage or memory units are provided for the master computer and each of the individual computers, and switching devices are arranged for controlling the interchange of data among the individual computers and between the individual computers and the master computer.

In the apparatus as described in the aforementioned application, the data transfer must take place under the control of the master computer in a cycle of operation having three phases. One phase is a control phase during which only the master computer is operative, the second phase is an autonomous phase, during which the individual computers are operative, and the third phase is one in which data exchange between the storage units of the individual computers and the master computers is accomplished, under the control of the master computer. Accordingly, the master computer must be utilized for control of the data transfer, as well as its principal tasks. Because of the other tasks required to be performed by the master computer, a so called general purpose computer must be employed, i.e., a computer which is suited for performing a multiplicity of tasks on the basis of its circuit construction and its programming. In the system of the aforementioned application, only about 12% to 17% of the capacity of the data bus is employed. It is desirable, therefore, to provide a means and apparatus for improving the efficiency of operation of the system.

BRIEF DESCRIPTION OF THE PRESENT INVENTION

It is the principal object of the present invention to provide an improved system in which the data transfer is carried out more expeditiously, using a greater percentage of the capacity of the data bus.

In accordance with one embodiment of the present invention, a data exchange processor is employed, separate from the master computer, and the data transfer among the several individual computers, and between the master computer and the individual computers, is controlled by operation of the data exchange processor. Since the data exchange processor serves only to control the data exchange, it is possible for it to achieve this purpose more effectively than a normal general purpose computer. In accordance with a more specific embodiment of the present invention, a data exchange processor is provided having a program storage unit for storing data transmission programs, and instruction decoder, a program control by means of which a suitable program can be called from the program storage unit in order to generate control commands for the functional unit of the data exchange processor (and the individual computers) from the instructions decoded by the instruction decoder, an address counter adapted to be preset to the starting address of a data block transfer and which supplies incrementally increasing addresses to the address bus until a comparator indicates the end of a data block, and an instruction counter, preset to the starting address of a selected program, for accessing successive instructions of the program.

The provision of such a data exchange processor permits the attainment of a very high transmission rate of data transfer among the components of the system, with a high rate of utilization of the data bus. The exchange processor is freely programmable, and allows selection of a specific data transfer program from a variety of such programs maintained in the program storage. It also permits the execution of switch and control instructions, and the processing of individual and block transfer instructions, for the transmission of individual data or data blocks, respectively. Due to the high rate of utilization of the data bus by the exchange processor, the length of time required for the data exchange is considerably reduced, without modifying the transmission time required for each data word. The advantages of the present invention are, therefore, attainable without the use of apparatus having a higher intrinsic speed of operation. In a still more specific embodiment of the present invention, an intermediate storage device is provided which permits the buffering of instructions, so that the next instruction to be performed is decoded while the preceding one is being utilized, to effect a substantial increase in the efficiency of the use of the data bus. The program storage unit stores not only the transfer instructions, but also the storage addresses pertaining to such instructions.

Other objects and advantages of the present invention will become manifest by an inspection of the following description and the accompanying drawings.

BRIEF DESCRIPTION OF THE DRAWINGS

Reference will now be made to the accompanying drawings, in which.

DESCRIPTION OF THE PREFERRED EMBODIMENT

Figure 1:
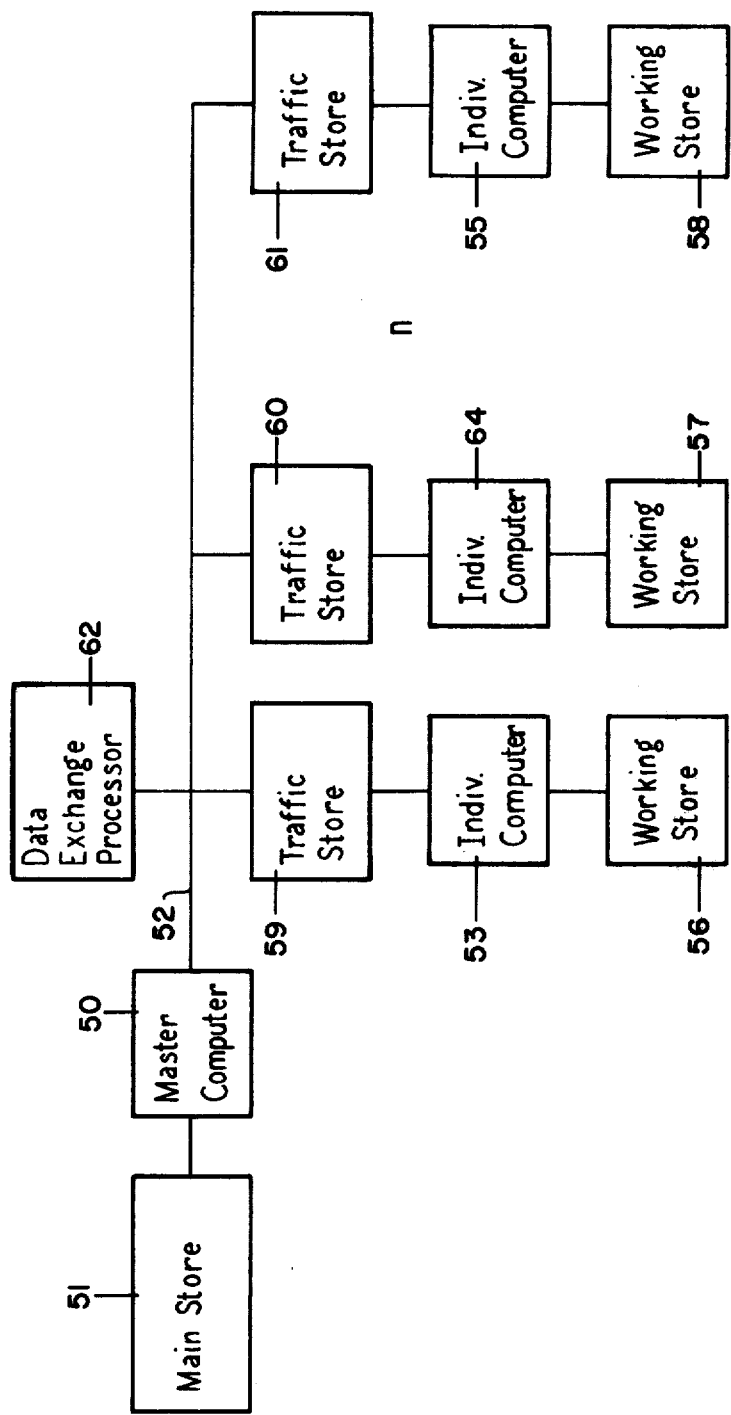
FIG. 1 illustrates a functional block diagram of a distributed computing system employing the present invention.

Referring now to FIG. 1, the general structure of a distributed processing system incorporating the present invention is illustrated. A master computer 50 having its main storage unit 51 is illustrated, with the computer 50 being connected to a data bus 52. A plurality of individual or slam computers 53, 54 and 55 are provided, each with its working storage unit 56, 57 and 58, and with a traffic store unit 59, 60 and 61. The traffic storage units are each connected to the data bus too. A data exchange processor 62 is also connected to the data bus 52, and is adapted to control the interchange of data among the individual computers and the master computer 50. Each individual computer, during the autonomous phase, has access to its traffic storage unit and to its working storage unit, and operates independently from the other computers and from the master computer. During this time, each of the individual computers carries out the program assigned to it. Only the master computer operates during the initial or control phase, and during which it has access not only to its own main storage unit 51, but also to the traffic storage units 59–62 of the individual computers. During the data transmission phase, the data transmission operations are carried on among the traffic storage units of the individual computers, and between these traffic storage units and the master computer 50. The control of this phase of the operation is under the control of the data exchange processor 62.

Figure 2:
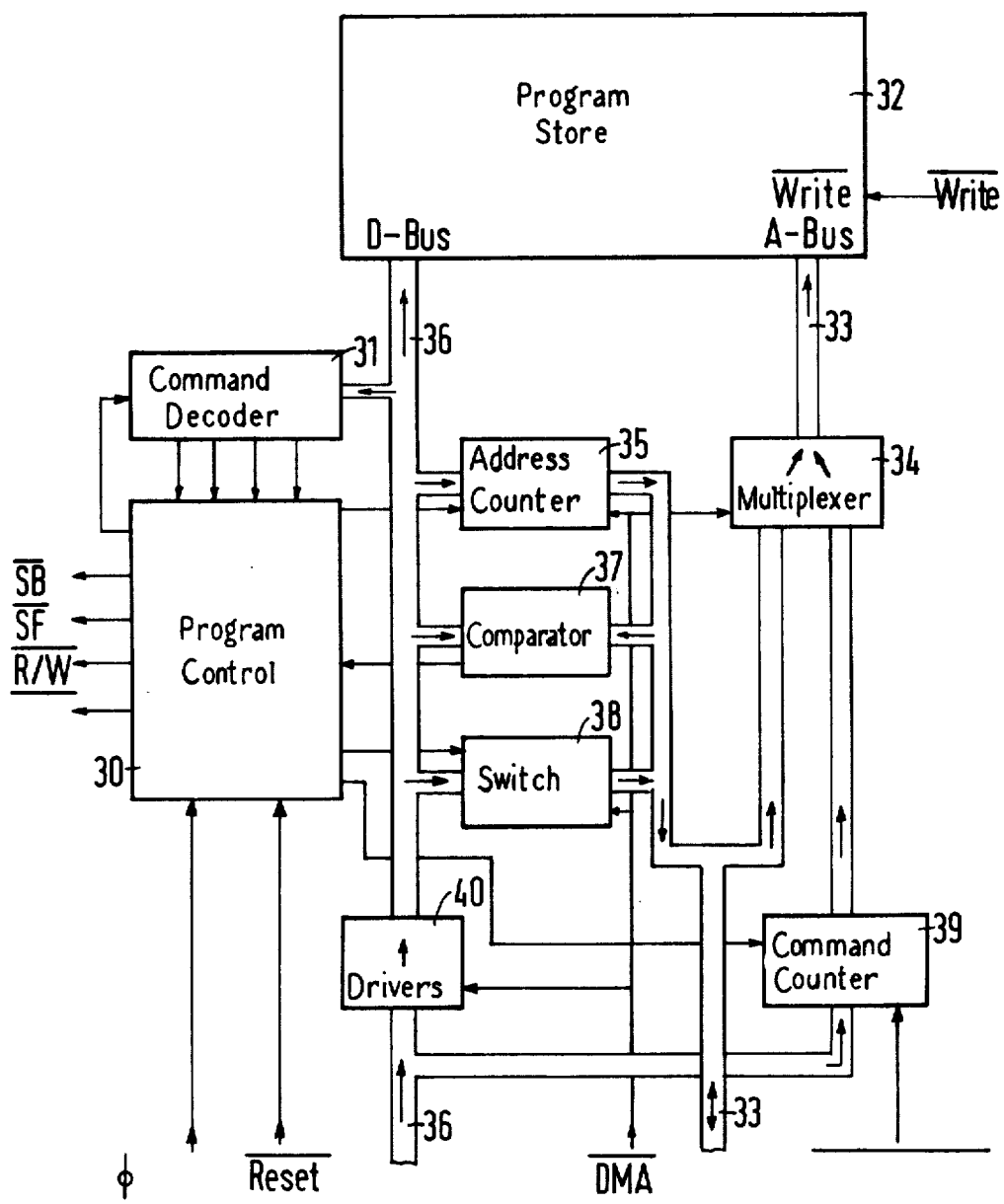
FIG. 2 is a functional block diagram of a data exchange processor constructed in accordance with one embodiment of the present invention.

FIG. 2 illustrates the block circuit of a data exchange processor 62. The data exchange processor comprises a program control unit 30 which comprises an intermediate store for the buffering of instructions and which is in position to call a suitable program from the program store 32, whereupon the instructions decoded by the instruction decoder 31 and called from the program store 32 are transposed into control commands for the functional units of the data exchange processor and the individual computers by means of the program control unit. An address counter 35 is also provided which is preset to the starting address in a data block transfer, and supplies ascending addresses for the address bus, a comparator 37 which is preset to the end address in a data block transfer and which indicates and identifies the end of the data block, and a command counter 39 which is preset to the starting address of the selected program and which is counted upward after each instruction of the program. The data exchange processor also comprises a driver 40 for the data bus 36, a multiplexer 34 for the address bus 33, and a switch 38 for supplying information from the data bus 36 to the address bus 33.

Suitable data transmission programs can be read into the program store 32 via a DMA-channel (direct memory access) 36,33.

The instructions, which consist of 16 bits, comprise a two bit operation code and a 14 bit address. Depending upon the type of instruction, the following types of operation codes indentify the address portion of the instruction.

00 Switching address
01 Starting address for a block transfer
10 Individual transfer address or end address for a block transfer.
11 Stop information The function of the data exchange processor will now be described. The command counter 39 is firstly preset to the starting address of the data exchange program selected. It is counted upward after each instruction and thus points to the next instruction. The instruction found at the address to which the command counter points is read out of the program store 32 and is decoded in the instruction decoder 31. The program control 30 produces therefrom the corresponding control signals for the functional units of the data exchange computer and for the traffic stores accessed by the data exchange computer. Switch addresses are directly connected through to the address bus 33 by means of the switch 38. The address counter 35 is preset to the starting address in block transfer commands, and the comparator 37 is preset to the end address. The address counter then produces ascending addresses on the address bus 33 until the comparator identifies the end of the data block. In the case of an individual transfer instruction, the transmission address is directly guided to the address bus 33. A stop instruction (stop information) terminates the data exchange program, to identify the end of the information transmission phase. The data exchange processor then supplies a corresponding command to the master computer in order to initiate the control phase.

Figure 3:
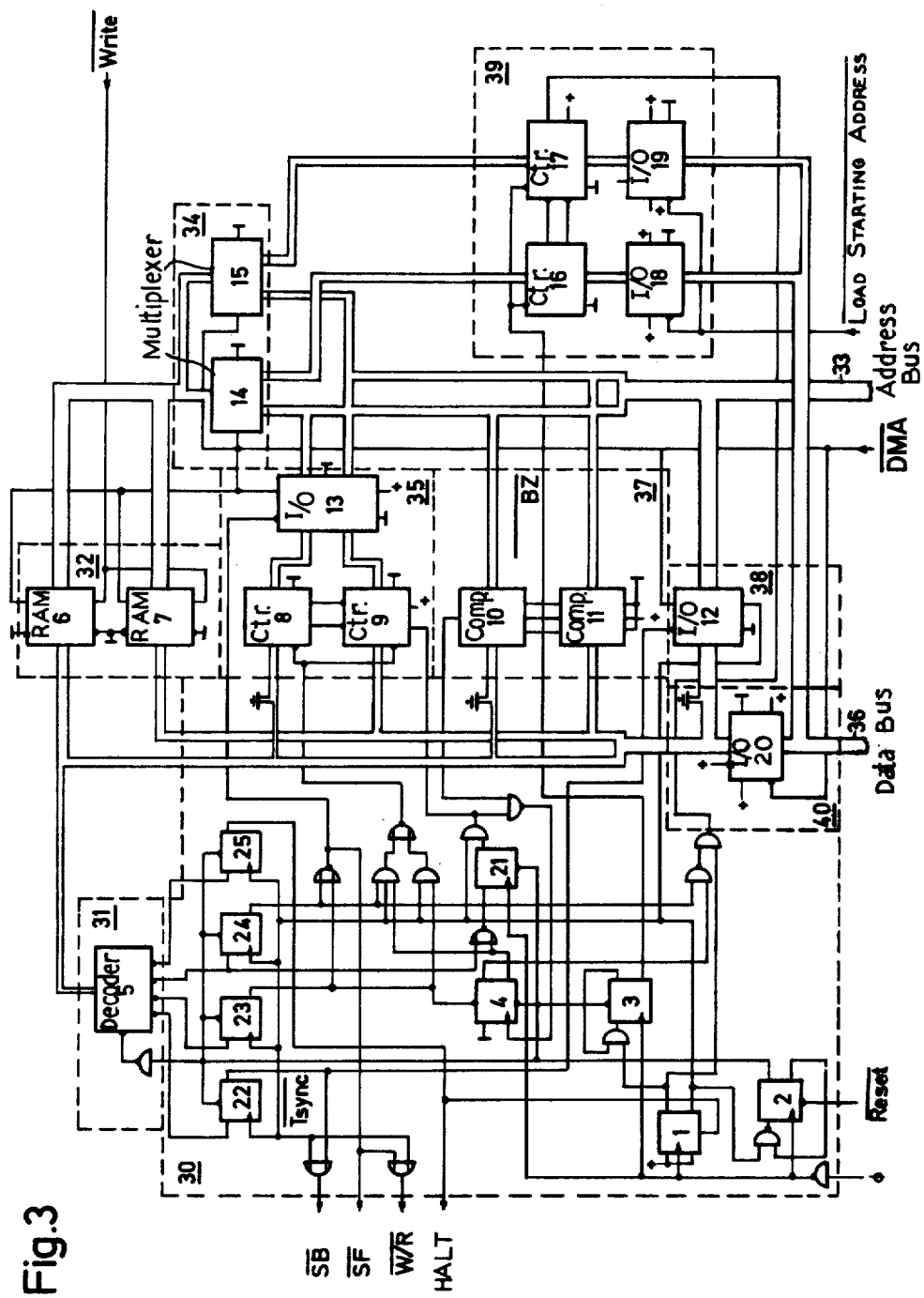
FIG. 3 is a more detailed functional block diagram of the data exchange computer illustrated in FIG. 2.

FIG. 3 illustrates the functional block diagram of the data exchange processor. The diagram is divided into the blocks which are illustrated in FIG. 2, by broken lines, and such blocks are provided with corresponding reference numerals. The circuit is constructed from a JK master-slave-flip-flop 1 (for example, of the type 7473), eight edge-triggered D-Flip-flops 2, 3, 4, 21, 22, 23, 24, 25, (for example, of the type 7474), one 2-bit-binary decoder 5 (for example, of the type 74139), two static 256×4 Bit RAM is 6 and 7, (for example, of the type AMD 9111), four 4-Bit binary counters with preset inputs 8, 9, 16 and 17 (for example, of the type 74193), two 4-bit comparators 10, 11 (for example, of the type 7485), five 8-bit latch modules 12, 13, 18, 19, 20 (for example, of the type 8212), four 2 to 1 multiplexers 14, 15 (for example, of the type 74157) and a series of gates. These components are commercially available from a variety of sources such as National Semiconductor, and American Microdevices.

The functional units of FIG. 2 are indicated in dash lines in FIG. 3, and bear corresponding numbers. The 8-bit latches 18 and 19 of the command counter 39 function to store the bits corresponding to the starting address. This is set into the 4-bit counters 16, and 17, and supplied by way of the multiplexer units 14 and 15 to the address inputs of the memory units 6 and 7. The multiplexer units 14 and 15 are controlled to pass the addresses from the counters 16 and 17 by the signal on the direct memory access control line.

The instruction located at that address is read out from the memory unit 6 to the decoder 5, which decodes the operation into 4 binary bits which are stored in flip-flops 22–25. The other gates and flip-flops of the program control unit 30 use the outputs of the flip-flops 22–25 to generate the various signals which are required for control of the various functional units of the data exchange computer. One signal developed by the program control increments the counter units 16 and 17 of the command counter 39, to access successive instructions stored in the memory units 6 and 7. Another signal operates the latch unit 12, to supply switching addresses from the data bus 36 to to the address bus 33. Addresses on the bus 33 may be used to set the comparator units 10 and 11 as well as to access the program store 32 through the multiplexer units 14 and 15, when the direct memory access signal has the oppostie polarity. The address counter 35 is preset to a starting address by signals generated by the program control unit 30, for block transfer commands, and these addresses are supplied to the program store 32 through the multiplexing units 14 and 15. The 8-bit latch 20 which forms the driver unit 40 serves to latch input data arriving on the data bus 36.

The following signal lines indicated in FIG. 3 have the indicated functions:

| | |
|---|---|
| φ | Input pulse |
| Reset | Reset- and start pulses |
| Write | Write signal for program store |
| DMA | Direct program store-access |
| Load Starting Address | Load starting address into command counter 39 |
| SB | Switching command strobe signal |
| SF | Switch release (release data path) |
| W/R | Write/read signal for the traffic storages accessed by the exchange processor |
| HALT | Stop Information |

The data exchange computer illustrated in FIG. 3 exhibits an intermediate store consisting of the four D Flip-flops 22, 23, 24 and 25 in its program control 30, so that during the execution of a command the next command can be buffered after being decoded. In this way, a very high utilization of the data bus is possible, with overlapping of the instruction-fetch and instruction-execution cycles. An improvement of the utilization of the data bus by the factor of about 7 is obtained by use of the present invention.

I claim as my invention:

1. In a computer system having several slave computers connected with each other by a transmission line, each of said slave computers having an individual storage device assigned thereto, and a master computer connected to said transmission line for controlling said system, said master computer having a storage device, the combination comprising;

a programmable data exchange computer connected to said transmission line, said data exchange computer being separate from said master computer and having an individual program storage device, timing means for sequentially generating timing signals for each of three operational phases, said master computer having means for responding to said timing signals during a control phase of said phases to cause said master computer to communicate with said slave computers the tasks they are to resolve in a subsequent phase, said slave computers having means for responding to an autonomous phase of said phases to resolve the tasks transmitted to them simultaneously and independently from each other and independently of said master computer, said slave computers having means for reporting to said master computer completion of execution by means of a stop-signal, said data exchange computer having means for responding to said timing signals during an information transmission phase of said phases after one of said slave computers has emitted a stop-signal, for exchanging data between storage devices of the slave computers and the master computer, said data being exchanged in accordance with programs stored in the program storage device of said data exchange computer.

2. Apparatus according to claim 1, wherein said program storage device stores individual transmission programs and block transmission programs, and said data exchange computer includes and instruction decoder, a program control unit for calling a selected program from the program storage device to produce control commands for the functional units of the data exchange computer and the slave computers by means of instructions of said selected program decoded by said instruction decoder, an address counter which is set by said instruction decoder to a starting address at the beginning of a data block transfer, said address counter supplying ascending addresses to said transmission line until a comparator which is set to the end address during the data block transfer indicates the end of the data block, and a command counter which stores the starting address of the selected program and subsequently identifies the next successive instruction in the selected program.

3. Apparatus according to claim 2, whrerein said program control unit comprises an intermediate store in which a decoded command is buffered during the execution of a preceding command.

4. Apparatus according to claim 2, wherein said program storage device contains transfer instructions consisting of an operation code and a storage address.

* * * * *